United States Patent [19]

McDonald

[11] 4,070,901
[45] Jan. 31, 1978

[54] SPEEDOMETER AND RATIO TESTING APPARATUS

[75] Inventor: William J. McDonald, Bundoora, Australia

[73] Assignee: Gyro Enterprises (Rotates) Pty. Limited, Victoria, Australia

[21] Appl. No.: 698,716

[22] Filed: June 22, 1976

[51] Int. Cl.² ............................................. G01P 21/02
[52] U.S. Cl. ........................................................ 73/2
[58] Field of Search ...................... 73/2, 117; 324/161, 324/158 F

[56] References Cited

U.S. PATENT DOCUMENTS 3,363,446  1/1968  Kaley ........................................... 73/2
3,962,912  6/1976  Borie ......................................... 73/2 X

*Primary Examiner*—James J. Gill
*Attorney, Agent, or Firm*—Lawrence E. Laubscher

[57] ABSTRACT

Testing apparatus for speedometers is disclosed including variable speed control driving means coupled to a flexible drive connection assembly that is adapted for connection with the speedometer. The drive connection assembly includes impulse generating means connected with a digital indicator for indicating the rotational rate of the cable assembly and for providing comparative readings of the indicator and the instrument being tested. The flexible drive assembly is adapted for connection with the flexible drive or the gear box coupling of the speedometer for checking the drive ratio upon rotation of the vehicle traction wheels when moving the vehicle a predetermined distance to determine the number of turns per unit of distance of the speedometer drive cable.

10 Claims, 4 Drawing Figures

SPEEDOMETER AND RATIO TESTING APPARATUS

This invention relates to testing apparatus, particularly a speedometer and like instrument testing apparatus of a portable type.

BRIEF DESCRIPTION OF THE PRIOR ART

While manufacturers of speedometers provide bench testing equipment and procedures and servicing and testing such instruments, it is necessary to remove the instrument from its working position to effect such servicing or testing. In the case of automotive vehicles the removal of such instruments from the instrument panel usually involves considerable time and labour. While a speedometer may be bench tested and prove accurate, this does not necessarily mean that the instrument is accurately recording the speed of the vehicle in which it is installed, since bench testing does not take into account other characteristics of the vehicle in which the instrument operates.

The necessity of a speedometer to give an accurate reading of the speed of a vehicle is particularly important in commercial vehicles, since various speed restrictions are applied by the authorities to vehicles of different load capacities. For economic reasons and carriage time considerations it is necessary that commercial vehicles be driven at speeds closely within the limits set down for such vehicles in order to avoid the heavy penalties likely to be incurred for speed infringements. This same situation also applies in some degree to private vehicles in that driver normally relies on his speedometer to indicate his speed in order to insure that he is not infringing the limits applied in any speed limit zone.

It has been found that many vehicles have a speedometer which does not accurately indicate the true speed of the vehicle. This fault can arise by reason of manufacturers not incorporating the correct speedometer to meet various options such as gear-box, differential ratio or tyre sizes which can affect the operation of a speedometer alternately, a dealer or owner may replace a speedometer with the wrong type, or else some mechanical or other alterations can be made to the vehicle which will affect the proper functioning of the speedometer.

SUMMARY OF THE INVENTION

The principal object of the present invention is to provide a testing apparatus, particularly for speedometers and like instruments said apparatus being of a portable nature adapted to test such instruments when in position on a vehicle and to test the instrument relatively to the respective driving mechanisms.

According to the invention, a testing apparatus for speedometers and like instruments includes a variable speed control driving means drive-coupled to a flexible drive connection assembly adapted to be coupled to a speedometer or like instrument for testing, said drive coupling including drive or impulse means for a digital indicator to indicate the rotational rate of the cable assembly and provide comparative readings of the indicator and the instrument being tested and with said flexible drive connection assembly adapted to be connected to a normal speedometer flexible drive or its gear box coupling for checking the drive ratio upon rotation of the vehicle traction wheels when moving the vehicle a predetermined distance to determine the number of turns per unit of distance of the speedometer drive cable.

The variable speed control driving means may comprise a variable resistance controlled electric motor energized from an external current source or from the battery of the vehicle incorporating the instrument to be tested.

The drive coupling to the flexible drive assembly and digital indicator may comprise a gear box having an input coupled to the electric motor, and two outputs each of which is respectively coupled to the flexible drive assembly for the instrument to be tested and to the master speedometer or digital indicator. The coupling to the master speedometer or digital indicator may be either by mechanical or electrically through a sender to the master instrument.

In a preferred arrangement there is provided a variable speed control device driving means drive-coupled to a flexible drive connection assembly adapted to be coupled to a speedometer or like instrument for testing, and a combination digital counter and revolution counter electronically responsive to rotation imparted to the speedometer or like instrument flexible drive connection assembly either by the variable speed control device, or from the drive mechanism of the speedometer or other instrument.

This arrangement may also preferably include a digital clock with starting and reset switches, a digital calculator for determining variations with a figure readout for the results of any test and a reset system to stop and start the digital counter or revolution counter.

There may also be provided a gear box having an input capable of being coupled to the flexible drive assembly, and with two equally rotatable outputs capable of being respectively connected to a speedometer and a tachometer or like instrument.

The testing apparatus, according to the invention, is adapted to be enclosed in a portable casing so that where motor vehicle instruments are being tested they are not removed from the vehicle but can be tested in the vehicle and in comparison to the drive mechanisms therefore. Furthermore the apparatus ca calibrate the whole speedometer system including the instrument itself, the particular tyres on the vehicle, the differential ratio and counter shaft gear box ratio.

BRIEF DESCRIPTION OF THE FIGURES

Reference will now to made to the accompanying drawings illustrating embodiments of testing apparatus in accordance with the invention.

DETAILED DESCRIPTION

Figure 1:
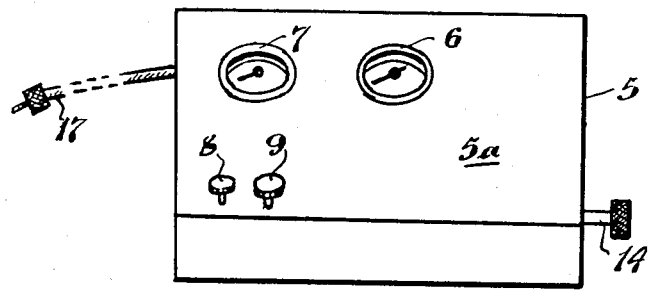
FIG. 1 is an elevation of the casing incorporating the testing apparatus diagramatically illustrated in FIG. 2, of one embodiment of the invention.
Figure 2:
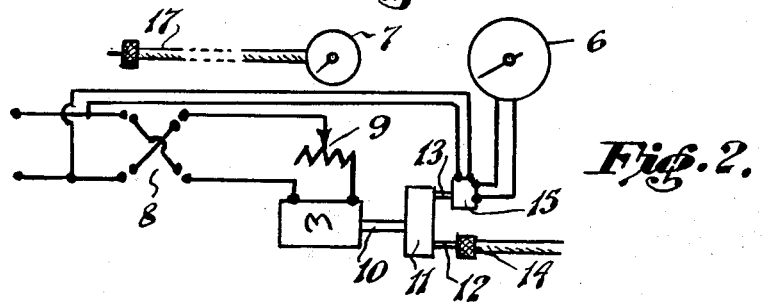

As illustrated in FIGS. 1 and 2 a speedometer testing apparatus comprises a casing 5 having an inclined instrument supporting face 5a and having mounted thereon a master speedometer 6, a ratiometer 7, a polarity reversing switch 8 and a variable resistance control 9.

Within the casing 5 and diagramatically illustrated in FIG. 2 there is supported an electric motor M, adapted to be operated from an automobile battery. Wiring is included to connect the motor to the battery through the polarity reversing switch 8 and the variable resistor 9 so that the motor may be rotated at a required speed and in the required direction as required by a particular speedometer to be tested.

The Motor M is drive coupled to the input 10 of a gear box 11 (of known type) having two output shafts 12 and 13 adapted to rotate at the same speed. One output shaft 12 is drive coupled to a flexible drive assembly 14 extending from one side of the casing, the outer or free end of which is adapted to be coupled to a speedometer after the normal drive coupling is disconnected so that the speedometer may be coupled to the apparatus without the necessity of removing the speedometer from the vehicle instrument panel.

The other output 13 of the gear box 11 is coupled to a sender or signal generator 15 which is wired to the master speedometer 6. The master speedometer may be a digital indicator.

A flexible drive 17 for the ratiometer 7 extends from the casing and the free end is adapted to be connected to one end of the speedometer drive cable or its gear box coupling.

In using the testing apparatus, to test a speedometer installed in a vehicle the following procedure is followed:

a. The vehicle cable assembly is detached from the speedometer or the gear box take-off, and the ratiometer drive 17 is attached thereto and the vehicle moved or driven over any predetermined distance to ascertain the actual cable turns required to drive the speedometer per unit of distance.

b. The flexible drive assembly 14 of the apparatus is then attached to the speedometer to test it for accuracey relative to the master speedometer 6. Also this test would show any inaccuracies in the tested speedometer arising from wear or other faults which would affect the accuracy of the speedometer reading.

The above test enables the speedometer accuracy to be determined and relates the speedometer to the drive ratio of the vehicle and enables these related factors to be integrated and corrections or adjustments made to the speedometer to accurately reconcile that instrument with the vehicle in which it is being used.

Figure 3:
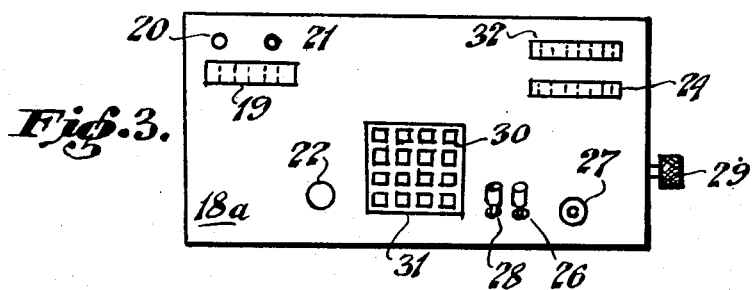
FIG. 3 is a plan view of a casing incorporating the testing apparatus diagramatically illustrated in FIG. 4 of a second embodiment of the invention.
Figure 4:
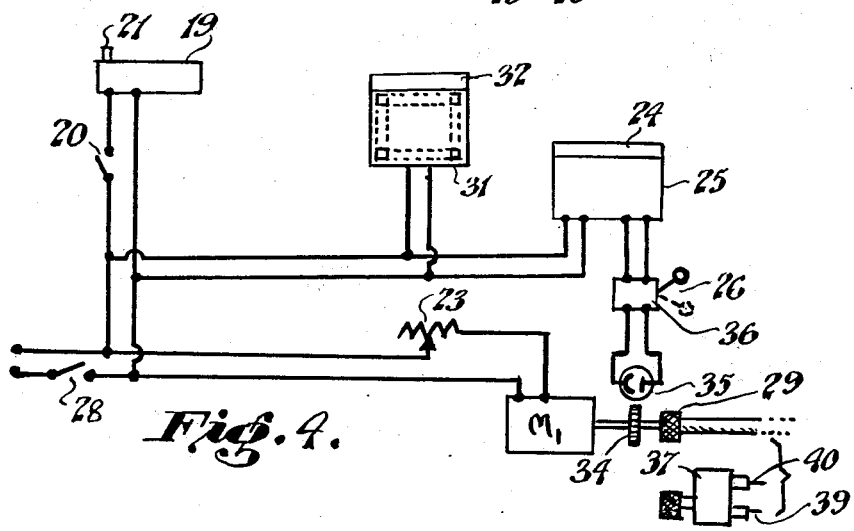

As illustrated in FIGS. 3 and 4 a more versatile, accurate apparatus is provided. As shown in FIG. 3, a casing 18 includes therein the apparatus diagramatically shown in FIG. 4. The front face 18a of the casing 18 shows the dial of a digital clock 19 with start and stop switch 20 and reset button 21 therefore , together with the adjusting knob 22 of a speed control resistor 23 for motor M, in the casing 18. A read-out dial 24 is also provided for a digital counter 25 which by toggle switch 26 controls an electronic counter to indicate either a shaft speed reading or a shaft rotation count of the motor M. A reset button 27 is provided for the digital counter. A power switch 28 is provided to energize the apparatus and the motor shaft is drive coupled to a flexible drive connection assembly 29 located at one side of the casing. The casing also includes the key board 30 of a digital calculator 31, the readout of which is given at 32.

As diagramatically shown in FIG. 4, the shaft of motor M is provided with a disk 34 having 100 slots therein arranged to energize a photo-electric cell 35 connected to a gating circuit represented at 36 and connected to the digital counter 25.

The apparatus is connected to an A.C. power supply which is rectified and/or resolved by well known means (not shown) to energize the various components of the apparatus.

As shown in FIG. 4 a gear box 37 of known kind having a single input 38 adapted to be connected to the connection assembly 29 will provide two outputs 39 and 40 to which two instruments e.g. a speedometer and tachometer may be simultaneously coupled and tested. A portable wheel and drive mechanism may also be provided so that the apparatus can be used independently of other drive mechanisms to be capable of measuring distance and speed. This drive mechanism would be attached to the cable or drive take-off to allow the device to be used under any conditions or requirements.

The apparatus can therefore perform any of the basic mathematical functions, achieve the results required and accelerate the action to calculate distance and/or speed on any vehicle or machine.

It will predetermine any distance required absolute and will program the requirement and hold that result and then show any discrepancy on any moving object that requires a mechanical device to activate any mechanical or electrical device to arrive at a final result. The evaluation procedure is simple, and requires only a few minutes of one person's time to process the data and determine any variations that may be present. It will compensate the percentage of inaccuracy to an absolute degree. Such inaccuracy is always present in motor vehicle types at various speeds, caused by centrifugal force and heat. The tests can be done from a moving or stationary position. It will measure length width and depth, it will calculate any material requirement, or any percentage thereof. Any object that rotates or moves back and forth would or could be programmed to a definite degree of accuracy.

The method of calibration of a speedometer is as follows:

a. The vehicle is moved a short distance and the rotation of the speedometer cable drive counter-shaft is measured. This is done by a photoelectric counter and wheel (34, 35 and 36) which resolves to 1/100 of a revolution. This is displayed on the digital counter 25.

If N is the number of revolutions of the counter shaft as the vehicle is moved a distance X, then N/X is the number of revolutions of the countershaft per unit length of the speed dimension provided X is measured in the same units as the speed dimension.

Hence for a vehicle driven at a speed of $v$ units/hour, the counter shaft revolutions per minute will be $Nv/X.60$. If X is in yards (for example) and $v$ is 60 miles/hour then the counter shaft speed will be N × 1760 × 60/X.60 r.p.m.

For $X = 11$ yards the counter shaft speed will be $$\frac{N \times 160 \times v}{60}$$

r.p.m. when $v$ is in m.p.h.

If $X$ is measured in metres and $v$ in km/h the counter shaft speed will be $$\frac{N \times v \times 1000}{\times 60}$$

r.p.m.

For $X = 10$ metres the counter speed will be $$\frac{N \times v \times 5}{3}$$

when $v$ is in km/h.

These distances are typical of the distances in practice.

The calculator 31 built into the panel 18a is used to determine the counter shaft speed in r.p.m. from the above, this display being displayed for as long as required.

b. To calibrate the instrument speedometer at a speed reading of v, cable is now driven at the speed determined by the above relationship. The instrument provides a driven shaft whose speed is controlled by a front panel knob 22 and measured by a photoelectric pick up 35 by counting the number of cycles occurring in a gate interval of 1 sec. This 1 sec. gate interval is derived from the power supply frequency.

This is displayed digitally on the front panel display and in practice it is only necessary to match this display with the predetermined shaft speed for the calibration required.

c. When these two displays correspond the speedometer reading is noted. This reading is the true reading corresponding to the vehicle speed v and the error is immediately obtained.

The only sources of error would be:
i. Error in moving the vehicle over the distance X.
ii. Effect of wheel slip when the vehicle is driven at speed on the road compared to rolling it slowly in the first phase of the calibration.
iii. Error in gating period used in indicating the r.p.m. of the speedometer in the second phase of the calibration procedure.

However, provided the distance X is accurately laid out and not less than a few yards or metres there should be no difficulty in rolling the vehicle the required amount.

The second error noted above due to wheel slip is not considered serious and is always possible in any speedometer driven from the vehicle transmission mechanism.

The error in the gating signal is wholly determined to supply system frequency stability. In Victoria the, Australia, for example, S.E.C. long term frequency stability is extremely good but instantaneous variation of up to 0.2% may occur at certain periods of the day. This will contribute a negligible error to the calibration.

The electronic circuit is basically digital and hence free of the scale errors associated wth analogue systems.

It will be apparent that various modifications may be made to the apparatus above described in that the master speedometer or digital indicator, or the ratiometer may be electrically actuated by suitable sensors or senders ad furthermore the speed control for te electric motor may include refinements to accurately reach and sustain a desired rate of revolution. Furthermore an electronic timer may be incorporated which would assist in distance or speed checking and could include a stop, start and reset stop clock with a digital display.

What is claimed is:

1. Apparatus for testing the accuracy of a vehicle instrument such as a speedometer, tachometer or the like having a rotary input shaft driven by te instrument drive meas of te vehicle, comprising
   a. counter means (25) adapted for connection with the instrument drive means when the instrument is in a disconnected condition and the vehicle is driven through a preselected distace, thereby giving an indication of the travel of the vehicle over said preselected distance;
   b. digital calculator means (31) for computing the actual number of turns of the instrument drive means per unit length of travel, expressed as a function of the speed of travel; and
   c. variable speed drive means for driving the instrument drive means at a computed rotational rate corresponding to a preselected speed of travel for said vehicle, whereby the actual and expected readings for the said vehicle instrument can be compared and the accuracy of said instrument determined.

2. Apparatus as defined in claim 1, wherein said variable speed drive means comprises a variable - resistor controlled motor ($M_1$) adapted for connection with a voltage source.

3. Apparatus as defined in claim 2, and further including impulse sending means connected between the output shaft of said motor and said digital counter means.

4. Apparatus as defined in claim 3, wherein said impulse sending means includes slotted disk means (34) driven by said motor, stationary photoelectric cell means (35) for generating signal impulses as a function of the rotation of said slotted disk means, and gating circuit means (36) for supplying said signal pulses to said counter means.

5. Apparatus as defined in claim 4, and further including switch means (26) for alternately switching said digital counter means between speed indicating and rotational count indicating conditions, respectively.

6. Apparatus as defined in claim 5, and further including gear box means (37) having an input shaft adapted for connection with the motor shaft, and a pair of output shafts adapted for connection with a pair of said vehicle instruments, respectively.

7. Apparatus as defined in claim 6, and further including digital clock means (19) connected between said counter means and said motor for checking distance and speed.

8. Apparatus for testing the accuracy of a vehicle instrument such as a speedometer, tachometer or the like having a rotary input shaft driven by the instrument drive means of the vehicle, comprising p1 a. ratiometer means (7) adapted for connection with the instrument drive means of the vehicle when the instrument is in a disconnected condition to afford an indication, thereby to indicate, after the vehicle is displaced over a predetermined distance, the actual cable turns required to drive the instrument per unit of distance;
   b. variable speed driving means (M) for rotatably driving said instrument drive means at a given speed; and
   c. digital indicating means (6) for presenting an indication of the rotational speed of said instrument drive means.

9. Apparatus as defined in claim 8, and further including
   d. gear box means (11) having an input shaft connected with said variable speed driving means, and a pair of output shafts adapted for connection with said instrument drive means and with said digital indicating means, respectively.

10. Apparatus as defined in claim 9, and further including impulse generator means (15) connected between said gear box means and said digital indicating means.

* * * * *